Figure 1:
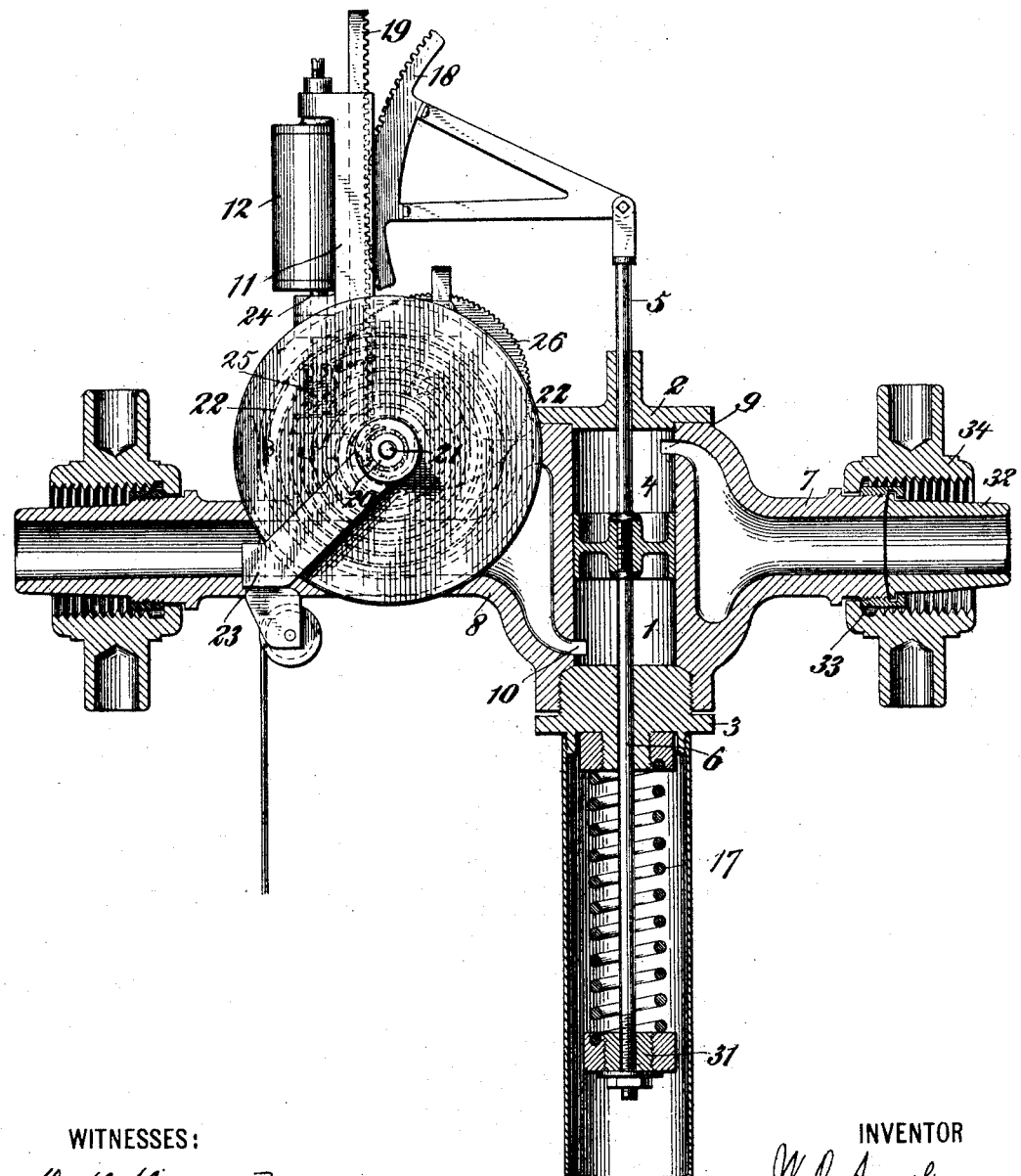

(No Model.) 4 Sheets—Sheet 1.

W. O. AMSLER.
WORK REGISTERING INSTRUMENT.

No. 587,293. Patented Aug. 3, 1897.

WITNESSES:

INVENTOR

BY

ATTORNEYS (No Model.) 4 Sheets—Sheet 2.
W. O. AMSLER.
WORK REGISTERING INSTRUMENT.

No. 587,293. Patented Aug. 3, 1897.

WITNESSES:

INVENTOR

ATTORNEYS (No Model.) 4 Sheets—Sheet 3.

W. O. AMSLER.
WORK REGISTERING INSTRUMENT.

No. 587,293. Patented Aug. 3, 1897.

WITNESSES:
D. H. Haywood
H. A. Casi

INVENTOR
W. O. Amsler
BY E. M. Marbleton
ATTORNEYS (No Model.) 4 Sheets—Sheet 4.
W. O. AMSLER.
WORK REGISTERING INSTRUMENT.

No. 587,293. Patented Aug. 3, 1897.

WITNESSES:

INVENTOR

UNITED STATES PATENT OFFICE.

WALTER OTTO AMSLER, OF PITTSBURG, PENNSYLVANIA, ASSIGNOR TO SCHAFFER & BUDENBERG, OF NEW YORK, N. Y.

WORK-REGISTERING INSTRUMENT.

SPECIFICATION forming part of Letters Patent No. 587,293, dated August 3, 1897.

Application filed August 1, 1896. Serial No. 601,308. (No model.)

*To all whom it may concern:*

Be it known that I, WALTER OTTO AMSLER, a citizen of the United States, residing at Pittsburg, in the county of Allegheny and State of Pennsylvania, have invented certain new and useful Improvements in Work-Registering Instruments; and I do hereby declare the following to be a full, clear, and exact description of the invention, such as will enable others skilled in the art to which it appertains to make and use the same.

My invention relates to instruments for measuring and recording the work done by steam and other vapor engines, and is designed to record directly the total amount of work done by such an engine within any given time.

My invention consists in the novel means employed for measuring and recording the work done by the engine and in the novel combination, construction, and arrangement of the parts of the instrument.

The object of my invention is to provide an instrument for measuring and recording the total work done by an engine within any given time which shall be accurate, compact, self-contained, shall be free from friction and wear between the integrating elements, and shall be easily operated, simple, and comparatively inexpensive. This object is attained in the invention herein described and illustrated in the drawings which accompany and form a part of this application, in which the same reference-numerals indicate the same or corresponding parts, and in which—

Figure 2:
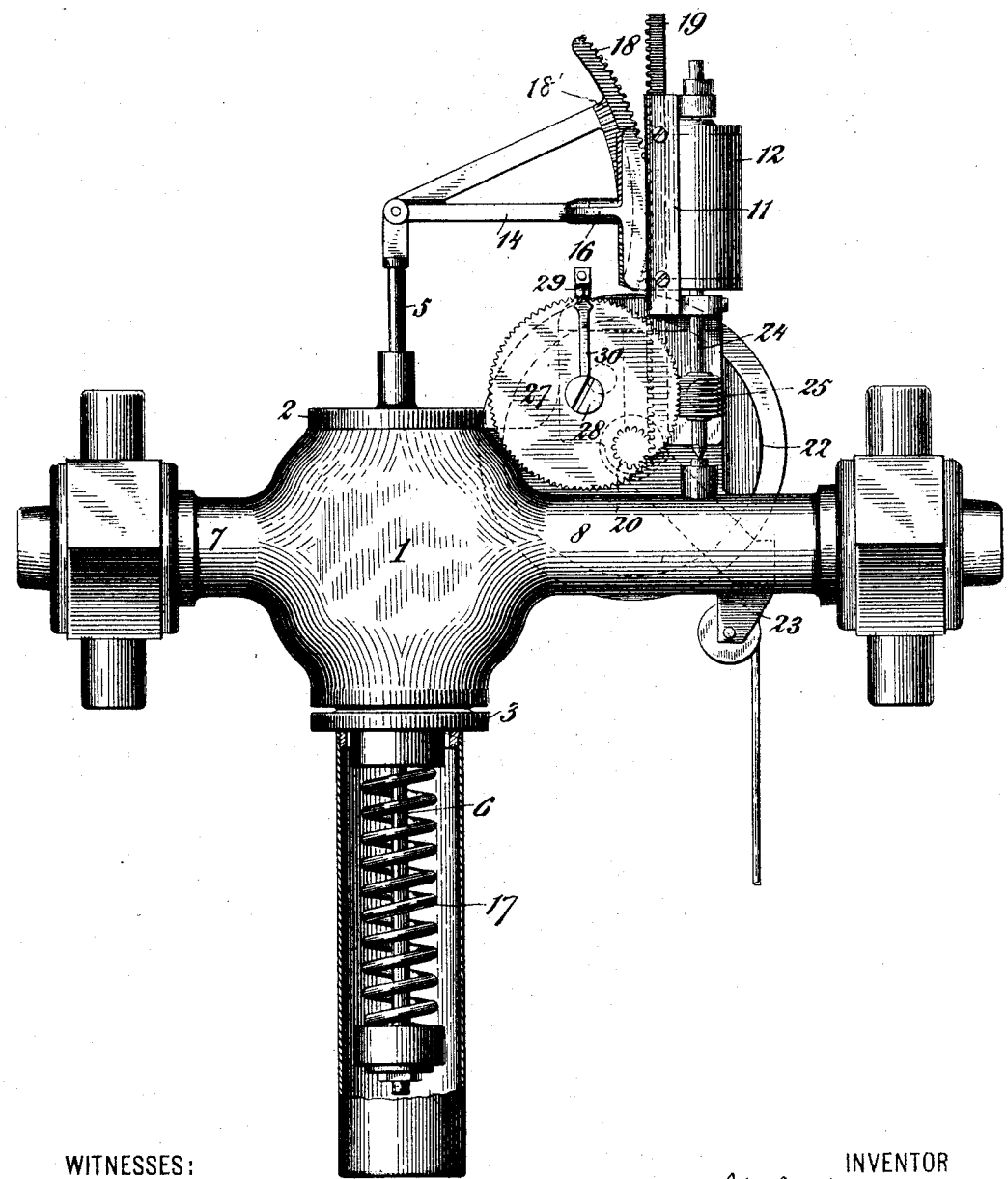
Figure 3:
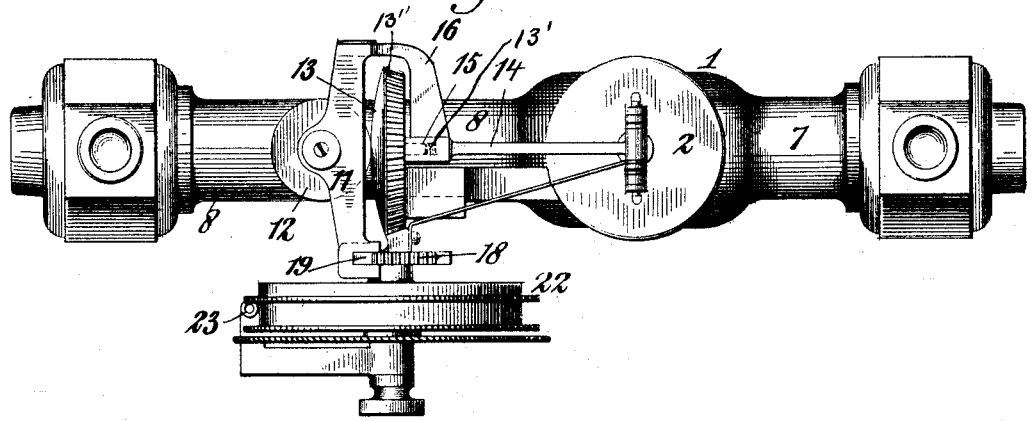
Figure 4:
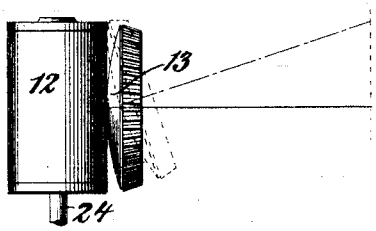
Figures 6, 7:
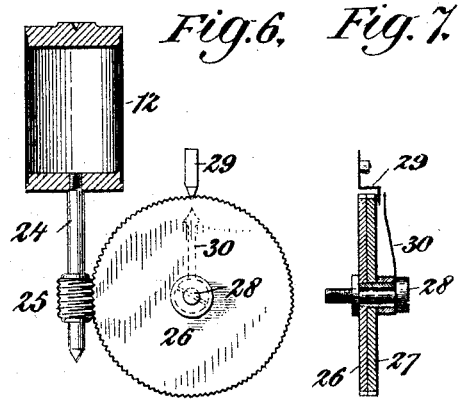
Figure 5:
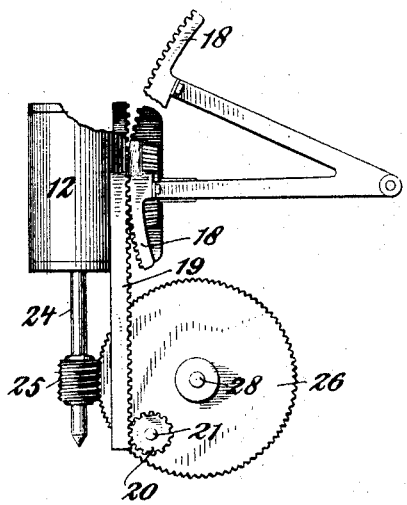
Figure 8:
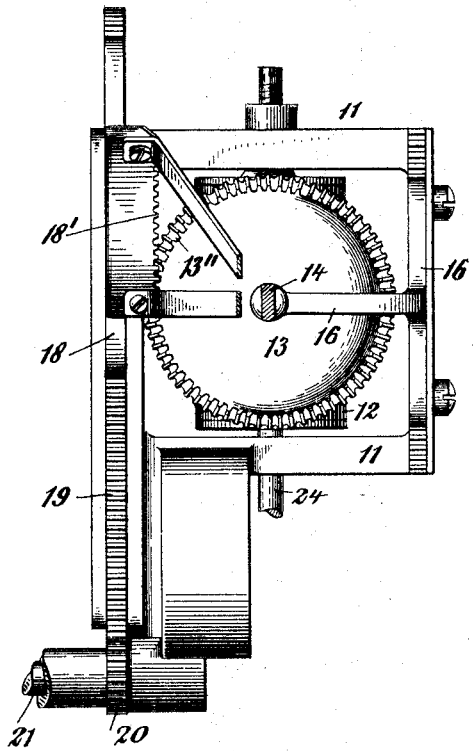

Figure 1 is a general elevation and partial section of the instrument, the steam-cylinder and side arms thereof being sectioned to show the steam-passages. Fig. 2 is a similar elevation of the instrument, taken from the side opposite to that from which Fig. 1 is taken. Fig. 3 is a plan view of the instrument. Fig. 4 is a diagrammatic view of the cylinder and spherical segment which form the integrating elements of the instrument, illustrating the rolling motion which is given to the sphere by the operation of the piston in the steam-cylinder. Fig. 5 is a detail view showing the cylinder, a portion of the spherical segment, the segmental gears, and the rack by which the sphere is rotated in a vibratory manner, the connection of the cylinder with the registering device being also indicated. Fig. 6 is a detail view showing the connection of the cylinder with the registering device. Fig. 7 is a sectional view of the two register-wheels; and Fig. 8 is an elevation looking from the right of Figs. 1 and 3 of the spherical segment, the integrating-cylinder, the frame which supports the cylinder, and the rack-bar and segmental gear by which the spherical segment is rotated detached from the main portion of the instrument.

The instrument consists of an integrating device similar to a planimeter, operated by the joint action of the piston of a steam-cylinder adapted to be connected to the engine-cylinder, and of a reciprocating driving device deriving its motion from some moving part of the engine. The planimeter used consists of two elements—viz., a revolubly-mounted cylinder and a segment of a sphere revolubly mounted in a carriage movable in a direction parallel to the axis of the cylinder and having frictional connection with the cylinder. The piston-rod of the instrument acting upon this carriage is arranged to roll the segment of the sphere along the surface of the cylinder in a direction parallel to the axis thereof. A driving device deriving its motion from the cross-head or other moving part of the engine is arranged to rotate the spherical segment about its own axis simultaneously with this rolling motion.

In the drawings, 1 is the steam-cylinder of the instrument, having upper and lower cylinder-heads 2 and 3, respectively, and a piston 4 with head and tail piston-rods 5 and 6, respectively, passing through bearings in the cylinder-heads 2 and 3. The cylinder is provided with side arms 7 and 8, having in them steam-passages communicating by ports 9 and 10 with the upper and lower ends of the cylinder, respectively. These side arms have upon their ends couplings by which the instrument may be connected to pipes leading to the ends of the cylinder of the engine to which the instrument is to be connected. The instrument is connected to the engine, therefore, in substantially the same manner as an ordinary steam-indicator. The side arm 8 supports a rectangular bracket 11, in which is pivoted the integrating-cylinder 12, which is one element of the integrating device or planimeter. The bearings of this cylinder are as nearly frictionless as possible, and the cylinder itself is made as light as possible. The construction of the cylinder is indicated in Fig. 6.

The other element of the integrating device is a spherical segment 13. (Shown in Figs. 3, 4, and 8.) This spherical segment rests against the surface of the cylinder 12 and has a driving contact therewith, being pressed against the cylinder by a spring 13'. It is carried upon a light carriage. This carriage consists of an arm 14, to which the spherical segment is attached by a central pivot-pin 15, (indicated in dotted lines in Fig. 3,) and which has bearings in the end of the arm 14, and an arm 16, forming a part of the arm 14, but extending to one side of the spherical segment 13 and having upon its end the teeth of a segmental gear meshing with the teeth of a rack formed in or carried by one side of the frame 11, as shown particularly in Fig. 2. The pitch-line of this rack lies in a plane tangent to the cylinder 12 and passing through the point of contact of the spherical segment 13 with the said cylinder. The arm 14 is coincident with the axis of the spherical segment. It is pivoted to the end of the piston-rod 5, and its length is such that the point at which the piston-rod is connected to the carriage is the center of the sphere of which the segment 13 is a segment. When the piston-rod is moved up and down by the action of its piston, the segmental gear upon the arm 16 rolls up and down in the rack of the frame 11, thus raising and lowering the spherical segment 13, and inasmuch as the point of connection of the piston-rod to the carriage is the center of the sphere of which 13 is a segment the segment is continuously in contact with the surface of the cylinder 12. Because the pitch-line of the rack of the frame 11 is in the plane tangent to the cylinder 12 at the point of contact of the segment 13 with the cylinder the motion of the segment with respect to the cylinder is a rolling motion and causes no friction or wear between the integrating-surfaces. This is shown in Fig. 4.

An ordinary indicator-spring 17 is fastened at one end to the rear cylinder-head and at the other end to the end of the tail-rod 6. When the piston is in the middle of the cylinder, this spring is relaxed. When the piston is moved to the upper end of the cylinder, the spring is compressed, and when it is moved to the lower end of the cylinder the spring is drawn out. The spring therefore works alternately in tension and compression.

The steam enters the cylinder 1 through steam-ports 9 and 10 alternately from the two ends of the engine-cylinder. The piston therefore has imparted to it a reciprocating movement, and so causes the spherical segment to roll up and down along the cylinder 12.

The spherical segment 13 has another movement imparted to it from the piston of the engine or some moving part connected therewith—viz., a rotary reciprocating movement about the axis, by which it is connected to the arm 14. Pivoted to the same pin which connects the arm 14 and piston-rod 5 is a segmental gear 18, the teeth on the end of which mesh with a rack-bar 19, mounted to slide up and down in guides in the bracket 11. The pitch-line of the rack 19 is also preferably in the plane tangent to the integrating-cylinder 12 at the point of contact of the spherical segment with the cylinder. The rack 19 engages with a pinion 20, (shown in dotted lines in Figs. 1 and 2 and in full lines in Fig. 5,) and this pinion is secured to an ordinary spring driving-drum 22, mounted upon a spindle 21, and having in its periphery a groove in which is a cord leading through a guide 23 to an indicator-rig on the engine. The indicator-rig is not shown, as it is not a part of the instrument, and may be of any ordinary construction. It is usually driven from the crosshead of the engine. The driving-drum has an internal coiled spring which resists the rotation of the drum transmitted from the engine to the drum by the indicator-rig and cord. The motion of the drum 22 therefore is a rotary reciprocating motion, which is communicated to the pinion 20, and by the pinion to the rack 19, which is thus caused to reciprocate vertically. This vertical movement of the rack is in turn transmitted to the segmental gear 18.

The segmental gear 18, besides having teeth on its end meshing with the rack 19, has on its side beveled gear-teeth 18' (shown in Figs. 2 and 8) meshing with corresponding beveled teeth 13" upon the side of the spherical segment 13. The reciprocation of the gear 18 therefore causes the spherical segment 13 to reciprocate in a rotary fashion about its pivot.

When the piston 4 is not moving the spherical segment 13 up and down along the integrating-cylinder 12, rotary reciprocating movement of the segment 13 about its axis, such as is caused by the driving-drum 22 and rack-bar 19, cannot cause the registration of work by the integrating-cylinder 12, and this is true whether the point of contact of the segment 13 with the cylinder 12 is in line with the axis of the segment or not, because while the movement in one direction of the rack-bar 19 may cause some forward rotation of the cylinder 12 the cylinder is moved back to its former position by the movement of the rack-bar 19 in the opposite direction. Also, the vertical movement of the spherical segment 13 with respect to the cylinder 12, due to the action of the piston 4, if it takes place without any rotation of the spherical segment about its axis, can cause no movement of the cylinder 12; but in the operation of the instrument the two motions of the spherical segment—viz., the up-and-down rolling motion and the rotary reciprocating motion—due, respectively, to the varying steam-pressures upon the piston 4 and to the reciprocating motion of the engine-piston, transmitted through the cord, driving-drum 22, rack 19, and gear 18, cause a rotary motion of the cylinder 12. The spherical segment and integrating-cylinder thus operated form a true integrating device, the number of revolutions of the integrating-cylinder within any given time being proportional to the power developed by the engine within that time.

In order to register the power developed by the engine, the shaft 24 of the cylinder 12 is provided with a worm 25, engaging with the teeth of the registering-wheels 26 and 27, mounted upon the same spindle 28. One of these wheels has a less number of teeth by one than the other wheel, the difference of pitch being so slight, however, that the teeth of both wheels will run in the teeth of the worm. There results a differential motion of the two wheels 26 and 27, the extent of which may be observed by a stationary pointer 29 and a movable pointer 30, the latter arranged to rotate with the wheel 26. The wheel 27 is suitably graduated. The worm-wheel and the wheels 26 and 27, meshing therewith, with their pointers, constitute a well-known device for recording the number of revolutions of a shaft and do not require more detailed illustration.

The operation of the instrument is as follows: The instrument is connected to pipes leading to the ends of the engine-cylinder in the manner in which an indicator is connected to an engine. The cord wound about the driving-drum 22 is connected to the indicator-rig of the engine in the ordinary manner, the guide 23, which is movable and adjustable, being adjusted so that the cord pulls in line. The instrument is then in readiness for use.

In the operation of the instrument steam enters the cylinder 1 alternately above and below the piston 4, according as steam is acting upon the front or rear of the engine-piston. This causes the piston 4 to reciprocate up and down, such reciprocation being resisted by the spring 17, so that the amplitude of reciprocation of the piston 4 and its position at any instant depend upon the pressure in the engine-cylinder. Simultaneously with the reciprocation of the piston 4 the driving-drum 22 is reciprocated about its axis, causing a vertical reciprocation of the rack-bar 19, which is communicated to the segmental gear 18 and thence to the spherical segment 13, causing the same to reciprocate in a rotary fashion about its axis. The reciprocation of the piston 4, acting upon the carriage of the segment 13, causes the segment to roll up and down the cylinder 12, thus constantly changing the point of contact between the segment and the cylinder and so varying the distance from this point of contact to the axis about which the spherical segment revolves—that is, varying the radius of the circle of contact. The result of the combined movements of the spherical segment is to cause a rotation of the cylinder 12 which is proportional to the power developed by the engine. This rotation of the cylinder 12 is communicated through the worm 25 to the registering-wheels 26 and 27, which keep a continuous record of the number of revolutions of the cylinder 12. The readings of the registering device, therefore, show the work which has been done by the engine up to the time when each reading is taken.

In determining the power developed by an engine by the use of the ordinary indicator an indicator-card is taken and after determining the area of this card, usually by means of a planimeter, but, if not by integrating, in some other manner, and after determining the number of revolutions of the engine the power developed by the engine is ascertained by calculation. It will be seen that this instrument performs these functions mechanically. Instead of taking an indicator-card an integrating device similar to a planimeter is operated directly by the piston and by the reciprocating driving device 22, and the readings of the registering device, which device may be graduated to the known dimensions of the engine, show directly the power developed by the engine, no calculations being required. The spherical segment 13 is pressed against the cylinder 12 by a light spring 13', placed in the socket in the end of the arm 14 and back of the pivot-pin of the segment. Only a slight pressure of the spherical segment against the cylinder is necessary. Instead of using a spring the cylinder may be magnetized and the spherical segment made of magnetic material, or vice versa.

The motion of the spherical segment 13 upon the integrating-cylinder 12 is a true rolling motion, without slipping or sliding, and therefore without wear of the integrating-surfaces. This is because the radius of the gear on the arm 16 of the carriage is the same as the radius of the spherical segment and because the pitch-line of the rack in which it works is in a plane tangent to the integrating-cylinder at the point of contact of the segment 13 with that cylinder. Former power-registering instruments and apparatus have this objection, that they require slipping or sliding of the integrating-surfaces upon each other, which necessarily results in wear of the integrating elements and loss of accuracy; but in this instrument there is no sliding or slipping of the integrating-surfaces, the segment 13 rolling upon the integrating-cylinder 12. Consequently there is no wear of the segment 13 or cylinder 12, and the instrument does not lose accuracy.

The instrument shown is double acting. It is of course practicable to make a single-acting instrument, in which case the cylinder 1 will be arranged to receive steam at one end only. If such a single-acting instrument is used on a double-acting engine, two instruments, one for each end of the engine, will be required to measure the work done by the engine. Therefore the double-acting instrument is preferable in most cases.

Since it is difficult to have the pipe connections leading from the ends of the engine-cylinder to the couplings of the instrument exactly in line, one of the couplings has a ball-and-socket joint. This joint in the coupling is shown at the right of Fig. 1. The conical tip 32 is separate from the side arm 7. The end of this tip is substantially spherical, and the end of the side arm 7 has a corresponding spherical recess to receive it. A flanged collar 33 secures the tip 32 somewhat loosely against the end of the side arm 7, so as to permit some movement of the tip. When the end of the pipe connection is placed within the nut 34 of the coupling, the tip 32 adjusts itself within the pipe connection and is then pressed thereby against the end of the side arm 7, so that no leakage can take place.

Having thus completely described my invention, what I claim, and desire to secure by Letters Patent, is—

1. In a work-registering instrument for engines, the combination, with an integrating device comprising a revolubly-mounted cylinder and a spherical segment in contact therewith and arranged to have two motions, one a rolling motion along the cylinder and parallel to the axis thereof, and the other a rotary motion about a radial axis which swings with the rolling of the segment, whereby the distance from the point of contact between the segment and cylinder to the said axis about which the segment rotates is varied, of a steam-cylinder adapted to be connected to the engine-cylinder and having a piston and a piston-rod arranged when the piston reciprocates to impart to the spherical segment one of its said motions, a spring opposing the movement of said piston, and a driving device, arranged to be driven from a moving part of the engine, and arranged when operated to impart to the spherical segment the other of its said motions, substantially as described.

2. In a work-registering instrument for engines, the combination, with an integrating device comprising a revolubly-mounted cylinder and a spherical segment in contact therewith, mounted in a carriage arranged to roll the segment along the cylinder and parallel to the axis thereof, said segment being arranged also to have a rotary reciprocating motion about a radial axis which swings with the rolling of the segment, whereby when the segment rolls the distance from the point of contact between the segment and cylinder to the said axis is varied, of a steam-cylinder adapted to be connected to the engine-cylinder and having a piston and a piston-rod arranged when the piston reciprocates to impart to the spherical segment one of its said motions, a spring opposing the movement of said piston, and a reciprocating driving device, arranged to be connected to and reciprocated by an indicator-rig on the engine, and arranged when reciprocated to impart to the spherical segment the other of its said motions, substantially as described.

3. In a work-registering instrument for engines, the combination, with an integrating device comprising a revolubly-mounted cylinder and a spherical segment in contact therewith, mounted in a carriage arranged to roll the segment along the cylinder and parallel to the axis thereof, said segment being arranged also to have a rotary reciprocating motion about a radial axis which swings with the rolling of the segment, whereby when the segment rolls the distance from the point of contact between the segment and cylinder to the said axis is varied, of a steam-cylinder adapted to be connected to the engine-cylinder and having a piston and a piston-rod connected to said carriage and arranged to operate the same, a spring opposing the movement of said piston, and a driving-drum, arranged to be connected to and reciprocated by an indicator-rig on the engine, and arranged when it reciprocates to reciprocate the spherical segment about its axis, substantially as described.

4. In a work-registering instrument for engines, the combination, with an integrating device comprising a revolubly-mounted cylinder and a spherical segment in contact therewith, rotatably mounted in a carriage movable in a direction parallel to the axis of the cylinder and having a gear having the same radius as the spherical segment and meshing in a rack the pitch-line of which is tangent to the cylinder at the point of contact of the segment therewith, of a steam-cylinder adapted to be connected to the engine-cylinder and having a piston and a piston-rod pivotally connected to said carriage at a point corresponding to the center of the sphere of which said segment is a segment, whereby when said piston reciprocates the segment is caused to roll along the integrating-cylinder, a spring opposing the movement of said piston, and a driving-drum, arranged to be connected to and reciprocated by an indicator-rig on the engine, and arranged, when so reciprocated, to reciprocate the spherical segment about its axis, substantially as described.

5. In a work-registering instrument for engines, the combination, with an integrating device comprising a revolubly-mounted cylinder and a spherical segment in contact therewith, rotatably mounted in a carriage arranged, when operated, to roll said segment along the cylinder and in a direction parallel to the axis thereof, of a steam-cylinder adapted to be connected to the engine-cylinder and having a piston and a piston-rod connected to the carriage and arranged to operate the same, a spring opposing the movement of said piston, a segmental gear, pivoted to said carriage at a point corresponding to the center of the sphere of which said segment is a segment, having teeth engaging corresponding teeth on the segment, and arranged, when reciprocated, to reciprocate the segment about its axis, a driving-drum arranged to be connected to and reciprocated by an indicator-rig on the engine, and means for causing the driving-drum to reciprocate said segmental gear, substantially as described.

6. In a work-registering instrument for engines, the combination, with an integrating device comprising a revolubly-mounted cylinder and a spherical segment in contact therewith, rotatably mounted in a carriage arranged to roll said segment along the cylinder and in a direction parallel to the axis thereof, of a steam-cylinder adapted to be connected to the engine-cylinder and having a piston and a piston-rod connected to said carriage and arranged to operate the same, a spring opposing the movement of said piston, a segmental gear, pivoted to said carriage at a point corresponding to the center of the sphere of which said segment is a segment, having teeth engaging corresponding teeth on the segment, and arranged, when reciprocated, to reciprocate the segment about its axis, a driving-drum arranged to be connected to and reciprocated by an indicator-rig on the engine, and a rack-bar, arranged to be reciprocated by said driving-drum, and engaging teeth on said segmental gear the pitch-circle of which has a radius equal to the radius of the spherical segment, substantially as described.

7. In a work-registering instrument for engines, the combination, with an integrating device comprising a revolubly-mounted cylinder and a spherical segment in contact therewith, mounted in a carriage arranged to roll the segment along the cylinder and parallel to the axis thereof, said segment being arranged also to have a rotary reciprocating motion about a radial axis which swings with the rolling of the segment, whereby when the segment rolls the distance from the point of contact between the segment and cylinder to the said axis is varied, and a spring pressing said spherical segment against said cylinder, of a steam-cylinder adapted to be connected to the engine-cylinder and having a piston and a piston-rod arranged when the piston reciprocates to impart to the spherical segment one of its said motions, a spring opposing the movement of said piston, and a reciprocating driving device, arranged to be connected to and reciprocated by an indicator-rig on the engine, and arranged, when reciprocated, to impart to the spherical segment the other of its said motions, substantially as described.

8. In a work-registering instrument for engines, the combination, with an integrating device comprising a revolubly-mounted cylinder and a spherical segment in contact therewith and arranged to have two motions, one a rolling motion along the cylinder and parallel to the axis thereof, and the other a rotary reciprocating motion about a radial axis which swings with the rolling of the segment, whereby the distance from the point of contact between the segment and cylinder to said axis about which said segment rotates is varied, of a steam-cylinder adapted to be connected to the engine-cylinder and having a piston and a piston-rod arranged when the piston reciprocates to impart to the spherical segment one of its said motions, a spring opposing the movement of said piston, a reciprocating driving device, arranged to be connected to and reciprocated by an indicator-rig on the engine, and arranged when reciprocated to impart to the spherical segment the other of its said motions, and a registering device, operated by said integrating-cylinder, and arranged to register the revolutions thereof, substantially as described.

In testimony whereof I affix my signature in presence of two witnesses.

WALTER OTTO AMSLER.

Witnesses:
HARRY M. MARBLE,
CAROLINE E. DAVIDSON.